United States Patent

[11] 3,577,814

[72] Inventor James Woodrow Hammond
  Camp Hill, Pa.
[21] Appl. No. 853,816
[22] Filed Aug. 28, 1969
[45] Patented May 4, 1971
[73] Assignee AMP Incorporated
  Harrisburg, Pa.

[54] APPARATUS FOR EXPOSING CORE OF AN INSULATED WIRE
  7 Claims, 10 Drawing Figs.
[52] U.S. Cl. .................................................. 81/9.51
[51] Int. Cl. .................................................. H02g 1/12
[50] Field of Search ..................................... 81/9.51, 9.5
  (A), 9.5 (M)

[56] References Cited
  UNITED STATES PATENTS
  1,874,216  8/1932  Andrien ...................... 81/9.51
  2,929,285  3/1960  Gulemi ....................... 81/9.51
  3,044,334  7/1962  Broske ....................... 81/9.51

Primary Examiner—Robert C. Riordon
Assistant Examiner—Roscoe V. Parker, Jr.
Attorneys—Curtis, Morris and Safford, Marshall M. Holcombe, William Hintze, William J. Keating, Frederick W. Raring, John R. Hopkins, Adrian J. LaRue and Jay L. Seitchik ABSTRACT: Apparatus for exposing the conducting core of an insulated wire comprises a pair of jaws movable relatively towards and away from each other between open and closed positions. Clamping means are provided on the corresponding ends of the jaws to clamp a wire extending between the jaws when the jaws are closed. The portion of the wire which extends between the jaws is loosely confined against substantial lateral flexure. Insulation pushing fingers mounted in the jaws are adapted to grip the insulation adjacent to the end of the wire and push it towards the clamping means. The insulation is bunched or compressed between the fingers and the clamping means and the end portion of the wire core which is thereby exposed for application of an electrical terminal.

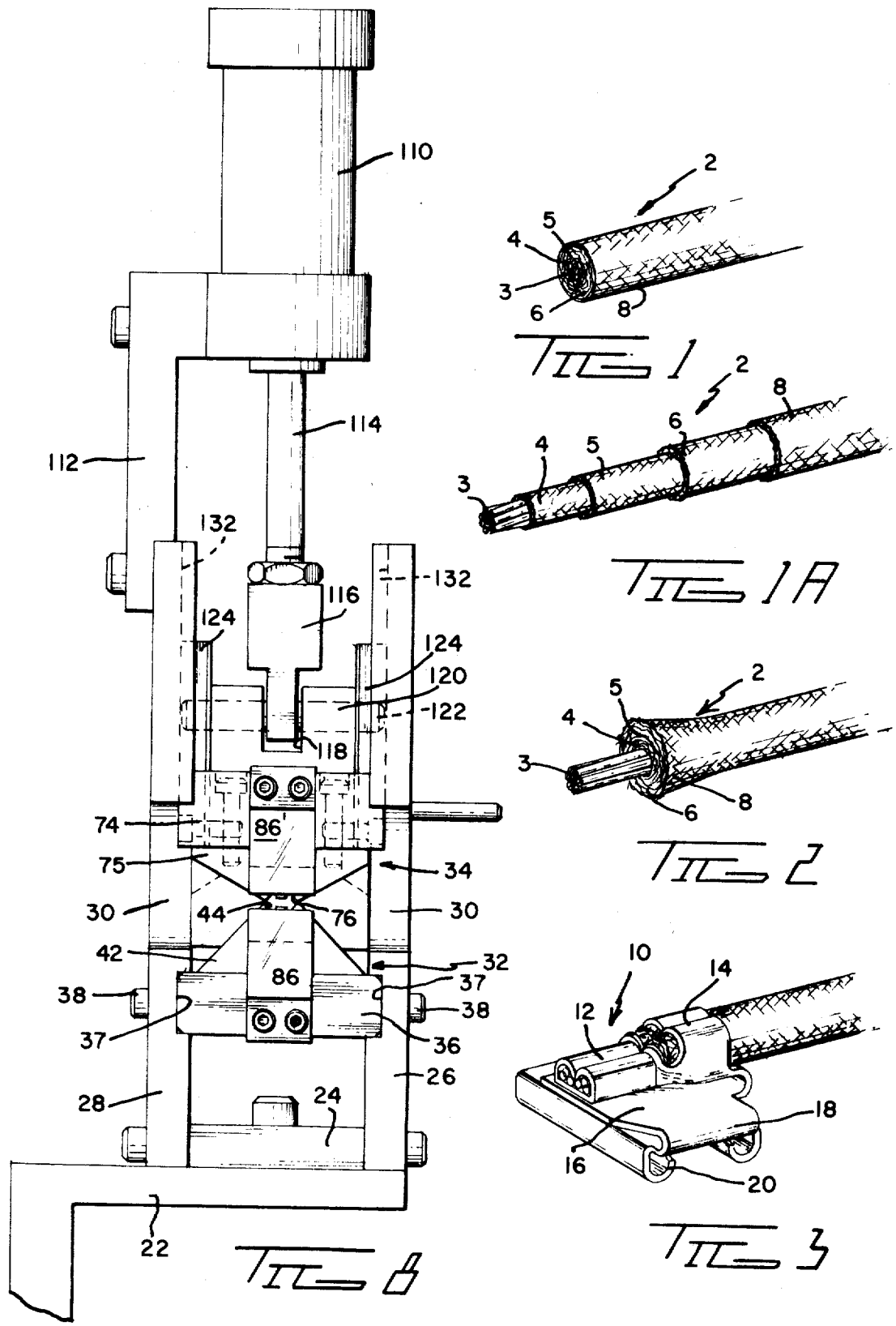

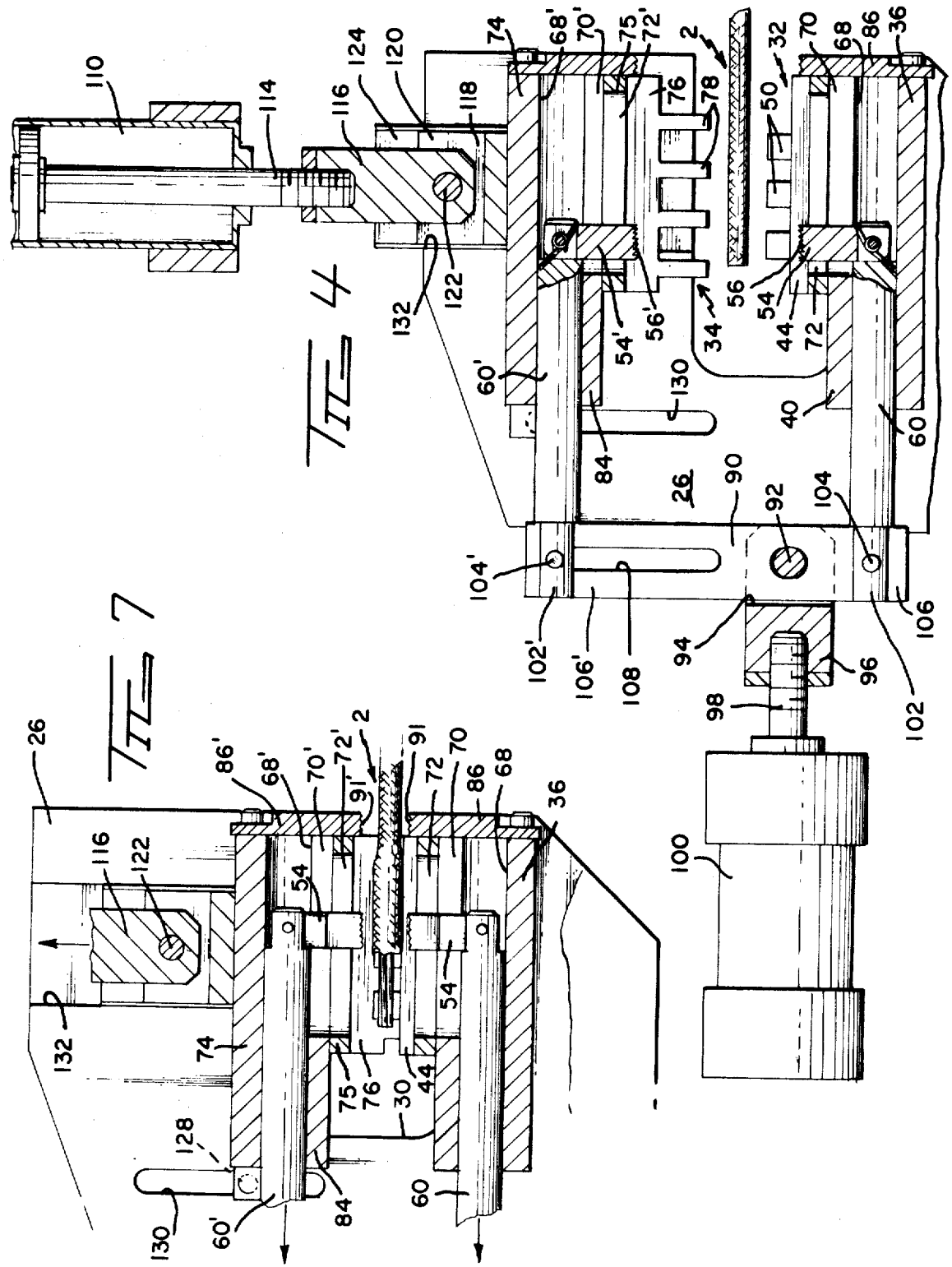

Patented May 4, 1971

APPARATUS FOR EXPOSING CORE OF AN INSULATED WIRE

BACKGROUND OF THE INVENTION

A wide variety of insulation stripping devices are commercially available which, in operation, cut through the insulation of the wire adjacent to the end thereof so that the end portion of the insulation may be stripped from the wire. Where the insulation is a conventional plastic insulation, this method of stripping is highly successful. Most of the plastic insulations which are presently used can be cleanly cut by the insulation cutting knives and the severed section of the insulation can be easily stripped from the wire end.

Certain types of insulated wire however, cannot be successfully stripped by the conventional stripping methods, particularly those wires which are insulated with layers of loosely woven fabric or wires which are insulated with batting and one or more layers of woven fabric. For example, one type of AWG 16 wire which is used where a high degree of flexibility is required has a conducting core of 104 very fine strands and an insulating sheath comprising a plurality of layers of loosely woven cotton fabric. Wire of this type is widely used in installations where an extremely limp wire is required which can be bent through extreme angles and which is required to undergo continuous or repeated flexure during use.

When it is attempted to strip these fabric insulated wires with a stripping mechanism having knives to cut through the insulation, it is difficult, if not impossible, to obtain a clean cut through the layers of fabric because of the fact that the woven fabric yields, and is compressed by, the insulation cutting knives. Furthermore, because of the limpness of these types of wires, it frequently happens that the insulation cutting knives will cut into some of the strands of the conducting core which, because of their extremely small diameter, are easily nicked and severed. Burning or singeing has been employed with some success to strip wires of this type but this process is relatively slow and the products of combustion of the singeing operation tend to deposit on the wire strands so that if a terminal is later crimped onto the strands, an imperfect electrical connection may result.

It is an object of the present invention to provide an improved apparatus for exposing the conducting core of a wire having insulation thereon of a type which cannot be easily removed by a conventional cutting and stripping operation. It is a further object of the invention to provide an improved apparatus for bunching or pushing the insulated wire away from the wire end and thereby to expose the end portion of the conducting core of the wire. A further object of the invention is to provide an improved apparatus for exposing the conducting core of an insulated wire of the type having one or more layers of woven cotton fabric thereon as the insulating material.

These and other objects of the invention are achieved in a preferred embodiment thereof which is briefly described in the foregoing abstract, which is described more fully in the description which follows, and which is shown in the accompanying drawings:

FIG. 1 is a perspective view of a typical fabric insulated wire.

FIG. 1A is a perspective view of the wire of FIG. 1 with portions of the several layers of insulation removed to reveal details of the insulation.

FIG. 2 is a perspective view of an end portion of the wire of FIG. 1 after the conducting core of the wire has been exposed in accordance with the invention.

FIG. 3 is a perspective view of the wire of FIG. 1 having a terminal crimped onto its exposed end.

FIG. 4 is a sectional side view of an insulation exposing apparatus in accordance with the invention showing the position of the parts at the beginning of the operating cycle with the jaws in their open positions.

Figure 5:
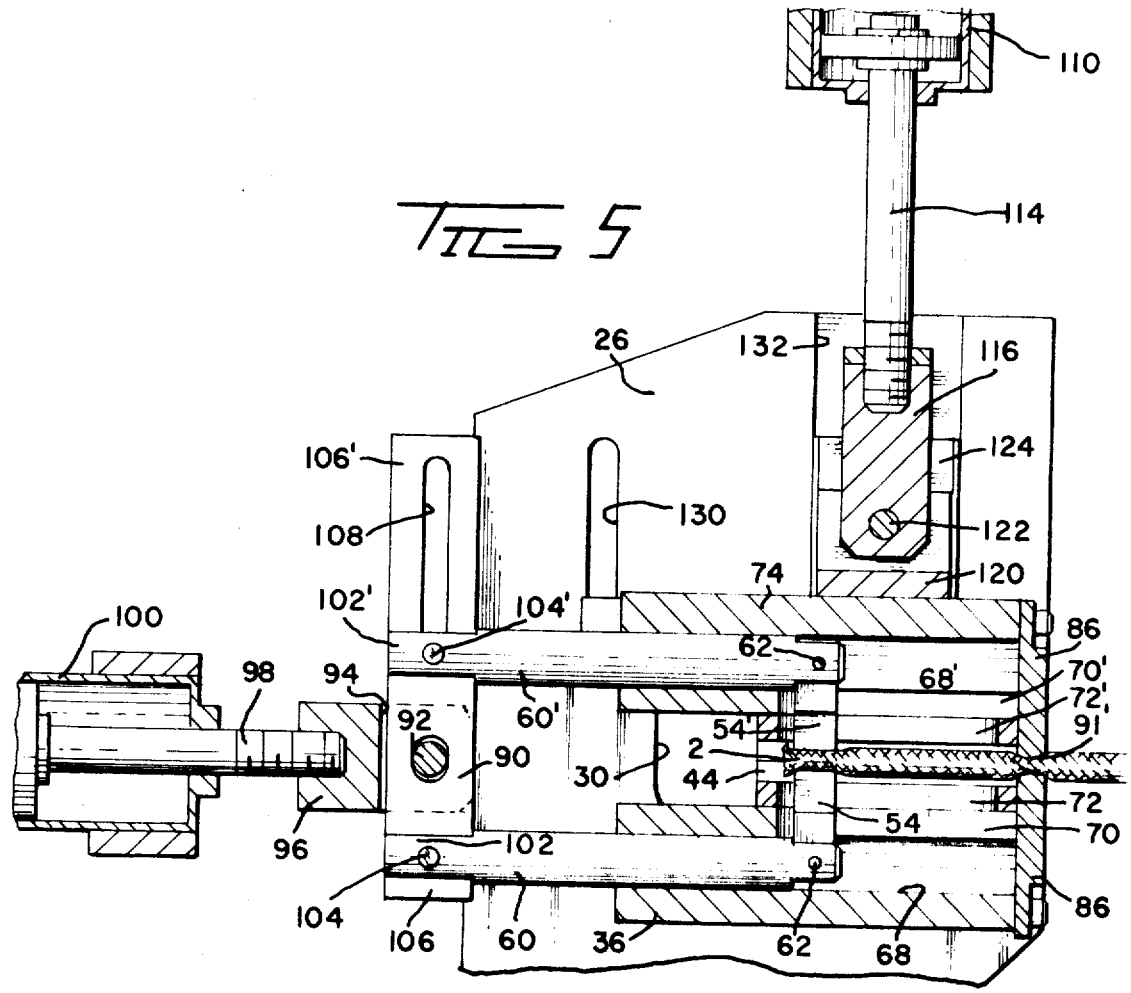
Figure 6:
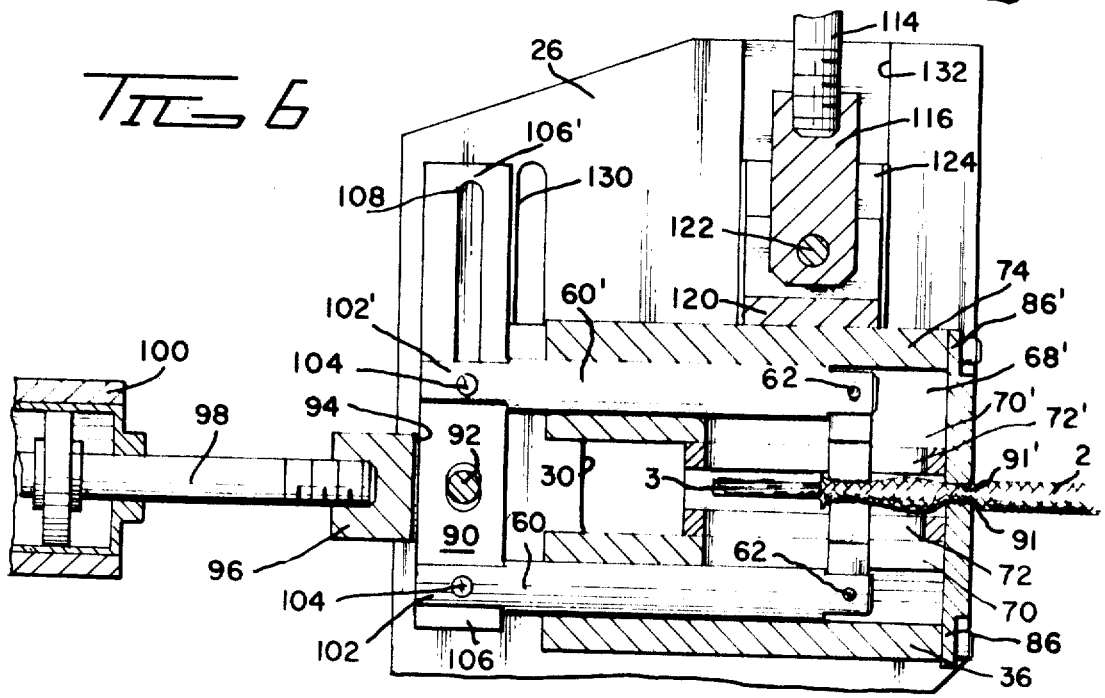

FIGS. 5, 6, and 7 are views similar to FIG. 4 but showing the positions of the parts at successive stages of the operating cycle.

FIG. 8 is a front view of the apparatus showing the position of the parts when the jaws are in their closed positions.

Figure 9:
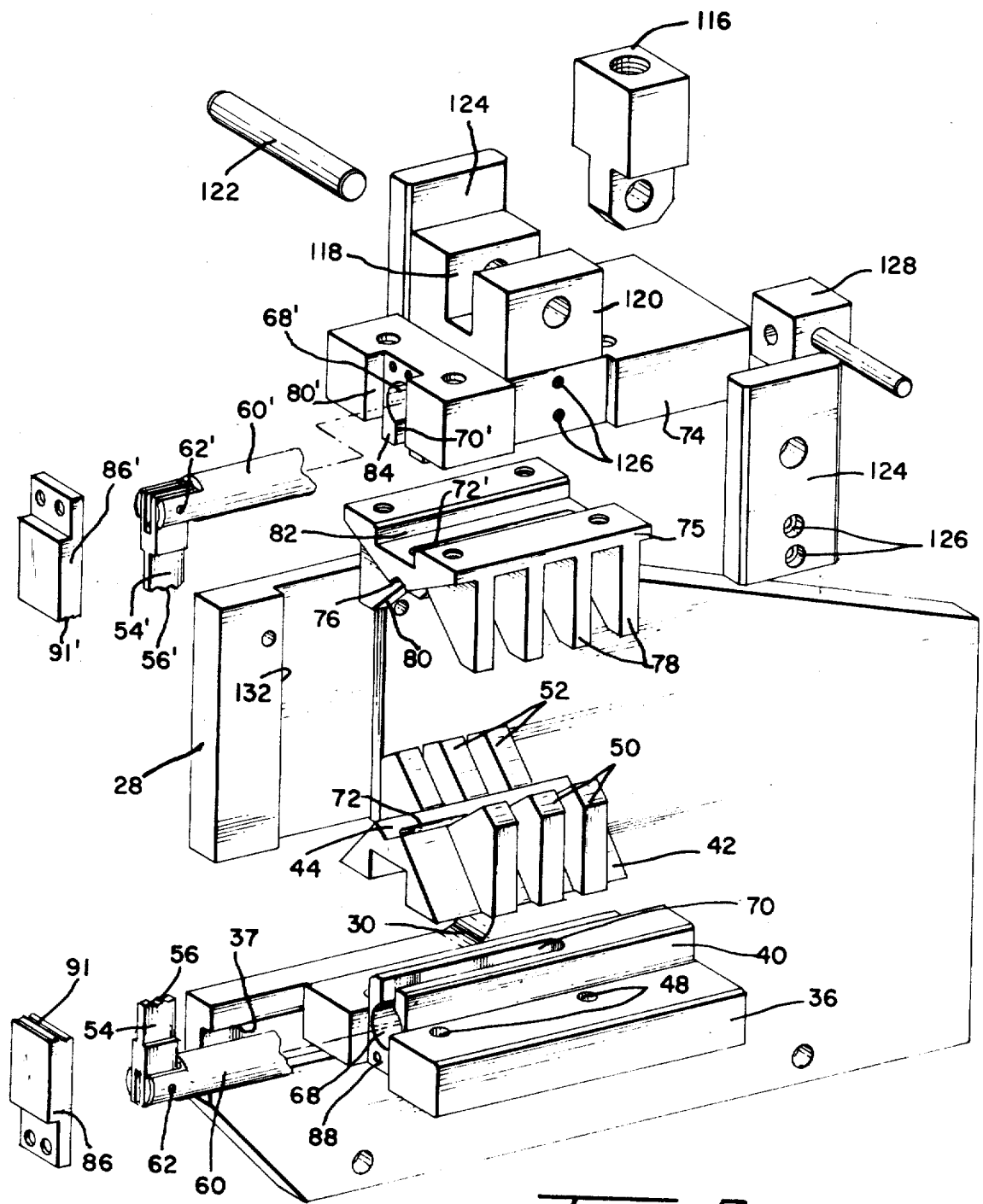

FIG. 9 is an exploded perspective view of the jaws of the apparatus of FIG. 4.

The disclosed embodiment of the instant invention is directed to the problem of exposing the conducting core of certain types of insulated wires which cannot be stripped, or which are difficult to strip, by conventional stripping methods. Conventional stripping methods involve the use of insulation cutting knives which cut the insulation so that it can be removed. A typical type of wire which is not amenable to conventional stripping processes is shown at 2 in FIG. 1 to comprise a conducting core 3 containing a plurality of individual strands, and a plurality of layers 4, 5, 6, 8 of loosely woven cotton fabric. Wires of this type usually have a relatively large number of individual strands in the core 3, for example, a typical AWG 16 wire having 104 individual strands rather than the conventional 21 or 28 strands. The large number of strands in the core coupled with the loosely woven fabric insulation renders these wires extremely limp so that they can be flexed, bent, twisted, and otherwise manipulated without failure of the insulation or work-hardening and eventual fracture of the strands of the core. Wires of this type are used, for example, for ironing cords or for cords for domestic appliances which are subject to a high degree of manipulation.

Wires of the type shown in FIG. 1 cannot be stripped by cutting through the insulation because of the fact that it is difficult to obtain a clean cut entirely through all of the insulation without damaging the conducting strands. The insulation is very soft and impressible and will readily yield before the cutting knife. Furthermore, if the cut does not sever all of the fibers of the woven fabric, the remaining fibers will prevent removal of the partially severed end section of insulation. Finally, if the cutting knife should contact one or more of the individual strands, there is a likelihood that the strand will be severed because of the fact that the strands are so very fine.

In accordance with the instant invention, the end portion of the insulating covering of the wire is pushed axially away from the wire end and bunched adjacent to the end as shown in FIG. 2. The exposed end portion of the conducting core can then be crimped onto a conventional terminal as shown in FIG. 3. The terminal in this view has a conventional wire crimp portion 12 and an insulation crimp portion 14 which are crimped onto the conducting core and the insulation of the wire respectively. The type of terminal shown also has a web 16 which extends laterally from the two crimped portions, which is reversely bent at 18, and is formed on the underside of the terminal to provide a receptacle 20 for the reception of the rectangular tab. It will be understood that any desired type of terminal can be crimped onto the exposed core of the wire shown in FIG. 2.

Referring now to FIGS. 4—9, the disclosed embodiment of the invention is adapted to be mounted on a bracket 22 which in turn may be mounted on a lead making machine of the type disclosed in U.S. Pat. application Ser. No. 814,361, as will be described below. The apparatus comprises a baseplate 24, secured to the upper surface of the bracket 22, a pair of spaced-apart vertically extending sideplates 26, 28 which are secured to the edges of the baseplate 24 and between which there is provided a fixed lower jaw structure 32, and a reciprocable upper jaw structure 34. As best shown in FIG. 4, the sideplates 26, 28 are provided with recesses 30 which extend inwardly from the front of the apparatus in the vicinity of the lower jaw to permit lateral movement of the wire to the position between the jaws and lateral movement of the wire from the jaws after exposure of the conducting core.

Referring particularly to FIGS. 4 and 9, the fixed lower jaw means 32 comprises a support plate 36, the marginal edge portion of which are received within slots 37 in the opposed sides of the frame plates 26, 28 and which is secured to the frame plate by suitable fasteners 38. An axially extending central rib 40 is provided on the upper surface of the plate 36, as viewed in FIG. 9, and a triangular block 42 having a rectangular recess on its underside is fitted over this rib, the block 42 being secured to the plate 36 by means of suitable screws which extend through the screw holes 48.

A V-shaped recess 44 extends along the upper end of the triangular block 42 intersecting the apex thereof and defining divergent sides. Additionally, spaced-apart projections 50 are provided on the sides of the block 42 and have edges 52 which are substantially coplanar with the divergent surfaces of the V-shaped recess 44 of the block. These projections cooperate with similar projections on the upper jaw to confine the wire during movement of the jaws towards each other and during the operation of the apparatus.

The insulation of the wire is grasped and pushed away from the wire end by means of a finger 54 in cooperation with the finger 54' on the upper jaw means. The finger 54 has an enlarged lower end which is received between a pair of spaced-apart ears on the end of a reciprocable rod 60 and the upper end of this finger is serrated as shown at 56. The lower end is slotted at 63 and pivotally mounted on the end of the rod by means of a suitable pin 62. A torsion spring 64 surrounds the pin 62 and has one arm which bears against the end of the slot 63 and another arm which bears against the rod 60. This arrangement permits very limited pivotal movement of the finger 54 so that it can adapt itself to the relatively soft compressible insulation of the wire during operation as will become apparent as this description proceeds.

Rod 60 extends leftwardly as viewed in FIG. 4 through a bore 68 in the block 36 and is connected at its left-hand end to a yoke arm 90 described below. A slot 70 is provided in the rib 40 of the plate 36 and a slot 72 is provided in the block 42 intersecting the recess 44 therein. The finger extends upwardly as shown in FIG. 4 through the slots 70, 72 so that its upper serrated end 56 is disposed between the surfaces of the recess 44.

The upper jaw structure 34 comprises a plate 74 having a central rib 84 on its underside which corresponds to the rib 40 of the plate 36. A block 75 is mounted on the underside of the plate 74, this block being somewhat similar to, although it is not identical to, the block 42 of the lower jaw structure. Thus the block 75 is generally triangular and has a plurality of spaced-apart projections 78 on its sides which are dimensioned and spaced-apart such that they will be received between the projections 50 of the block 42 when the jaws are in their closed positions. It will also be noted that the apex of the block 75 is provided with a V-shaped recess 76 which is complimentary to the recess 44 of the block 42. Block 75 is secured to the underside of plate 74 by suitable fasteners as shown.

The insulation pushing finger 54' of the upper jaw structure is substantially similar to the pushing finger 54 of the lower jaw structure described above and is pivotally connected in the same manner as the lower pusher finger, to the rod 60'. This rod is slidably contained in a bore 68' of the block 74 and the finger 54' extends through aligned slots 70', 72' of the plate 74 and the block 75.

When the jaws are closed, the wire extending between the jaws is clamped by means of a pair of clamping plates 86, 86' which are mounted in recesses 88, 88' on the right-hand ends of the plates 36, 74 as viewed in FIG. 4. The opposed ends of these clamping plates 86, 86' are serrated as shown at 90, 90' to assist in clamping the wire firmly during the wire core exposing operation.

The left-hand ends of the rods 60, 60' are pivotally connected to the yoke arm 90 which extends vertically through a slot 94 in a clevis block 96 on the end of a piston rod 98 of a pneumatic piston cylinder 100. The yoke arm is connected to the block 96 by means of a pivot pin 92 which extends through a somewhat oversize opening in the yoke arm 90 to permit very limited pivotal movement of the yoke arm relative to the block in order to avoid jamming of the apparatus during rightward movement of the rods 60, 60' from the position of FIG. 4 to the position of FIG. 6. The connection between the lower rod 60 and a lower end 106 of the yoke arm is by means of reduced end 102 of the rod 60 having a slot which receives the lower end of the yoke arm, the parts being connected by a pin 104. The upper rod 60' similarly has a reduced left-hand end 102' which is slotted for the reception of the yoke arm. The upper portion 106' of the yoke arm, as viewed in FIG. 4, is provided with a vertically extending slot 108 through which the pin 104' extends, the length of this upper portion 106' being substantially greater than the length of the lower portion and being sufficient to permit downward movement of the upper jaw structure 34 from the position of FIG. 4 to the position of FIG. 5. The pin 104' extends through the slot 108 thus permitting downward movement of the rod 60' with the upper jaw structure.

The upper jaw 34 is moved downwardly from the position of FIG. 4, to the position of FIG. 5 by means of a pneumatic piston cylinder 110, mounted on a suitable bracket 112, having a piston rod 114. A coupling block 116 secured to the end of this piston rod extends into a central recess 118 and a clevis block 120 which is disposed above the upper surface of the plate 74. A pin 122 extends through the clevis block, through the reduced lower end of the block 116, and extends laterally beyond the sides of the clevis block and into clevis plates 124 which are secured to the sides of the frame plate 74 of the upper jaw and secured thereto by suitable fasteners 126. The clevis plates 124 are slidably received in vertically extending recesses 132 in the opposed surfaces or frame plates 26, 28. It will thus be apparent that upon downward movement of the piston rod 114 from the position of FIG. 4 to the position of FIG. 5, the upper jaw structure will be pushed downwardly to close the jaw onto the wire. It is desirable to provide an auxiliary guide means for the left-hand end of the upper jaw structure in the form of a vertically extending slot 130 in the frame plate 26 and a guide member mounted on the end of the plate 74 which extends into this slot. This auxiliary guide means prevents any rocking of the movable jaw which might otherwise lead to jamming of the parts.

In use, the parts will normally be in the position shown in FIG. 4. The wire is positioned between the jaws with its end disposed approximately between the opposed serrated ends of the insulation pushing fingers 54, 54'. Compressed air is then admitted into the upper end of the piston cylinder 110 thereby driving the piston rod 114 and the upper jaw structure 34 downwardly from the position of FIG. 4 to the position of FIG. 5. As this upper jaw moves downwardly, the projections 78 of the block 75 enter the spaces between the projections 50 of the block 42 thereby confining the wire. As the upper jaw moves further downwardly, the surfaces of the V-shaped recesses 44, 76 move towards each other and the projections 78 move further into the spaces between the projections 50. At the end of the downward stroke of piston rod 114, the wire is confined in a restricted corridor although it is not clamped or otherwise engaged by the surfaces 80 and 52 of the projections. The wire is firmly clamped by the clamping members 90, 90' and the fingers 54, 54' are in firm engagement with the insulation adjacent to the end of the wire. Compressed air is then supplied to the left-hand end, as viewed in FIG. 4, of the piston cylinder 100 to cause the piston rod 98 and the rods 60, 60' to move rightwardly from the position of FIG. 5 to the position of FIG. 6. During such movement of the fingers, the insulation is pushed rightwardly and gathered or bunched between the fingers 54, 54' and the clamping members 86, 86'. The wire will tend to buckle during such pushing of the insulation but will be prevented from buckling to any substantial degree by the surfaces 52, 80 of the projections 50, 78 and by the surfaces of the recesses 44, 76 of the blocks 42, 75.

After the insulation has been pushed rightwardly to the position of FIG. 6, the core of the wire is exposed to the extent necessary to permit crimping of a terminal onto the wire end. After the parts have reached the position shown in FIG. 6, the rearward ends of the cylinders 110, 100 are exhausted thereby permitting upward movement of the piston rod 114 and leftward movement of the piston rod 98. The movements of these two piston rods can take place concomitantly and the wire can thereafter be moved from between jaws to the crimping press. In the disclosed embodiment of the invention, the wire can be moved laterally into the apparatus to a position between the jaws and can, after exposure of the conducting core, be moved laterally to a crimping apparatus. Operations of this type can be carried out conveniently on a lead making machine of the general type disclosed in U.S. Pat. application Ser. No. 814,361, as discussed above.

It has been found in practice that wires having several layers, e.g. four layers, of fabric insulation can be processed in accordance with the invention to expose a sufficiently long portion of the conducting core to permit application of a contact terminal thereto. The insulation may have some tendency to creep forwardly after it has been pushed back however, such creepage takes place relatively slowly and if the terminal is applied soon after exposure of the core, a sufficiently long exposed section will remain.

Some salient features of the invention include the clamping of the insulation adjacent to its end, the confinement of the wire during the operation of pushing the insulation away from the wire end, and finally the provision of the fingers 54, 54' which bear against the surface of the insulation and compress it slightly while it is being pushed away from the wire end. This effect is permitted by virtue of the fact that these fingers extend through the plates 42, 75 which have the confining means for the wire thereon.

While the invention has been disclosed herein with particular reference to fabric and batting-type insulations which are not amenable to conventional cutting-type insulation-type stripping methods, it will be apparent that the principles of the invention can be used to expose the conducting core of various types of insulated wire having loose insulation which cannot be stripped by conventional methods.

Changes in construction will occur to those skilled in the art and various apparently different modifications and embodiments may be made without departing from the scope of the invention. The matter set forth in the foregoing description and accompanying drawings is offered by way of illustration only.

I claim:

1. Apparatus for exposing the conducting core of the end portion of an insulated wire comprising:
   clamping and confining means for clamping said wire at a location adjacent to its end and for confining the portion of said wire between said clamping means and the end of said wire against substantial lateral flexure,
   insulation pushing and gathering means movable through said clamping and confining means and towards said location, said insulation pushing and gathering means having insulation engaging means engageable with said insulation on opposite sides of said wire whereby, upon movement of said insulation gathering means towards said location, the insulation of said wire is gathered away from the end of said wire and bunched between said insulation engaging means and said location thereby to expose the end portion of the conducting core of said wire.

2. Apparatus for exposing the conducting core of an insulated wire comprising:
   a pair of jaw members movable relatively towards and away from each other between open and closed positions,
   said jaw members having clamping means at one end thereof to clamp a conductor extending therebetween when said jaw members are in said closed position, and said jaw members having opposed surface portions defining a confined passageway for said wire when said jaw members are in said closed position,
   insulation pushing means movable through said passageway and towards said clamping means when said jaw members are closed whereby upon closure of said jaw members into surrounding relationship with a conductor with concomitant clamping of said conductor and confinement of the end portion of said conductor in said passageway, and upon movement of said insulation pushing means towards said clamping means, the insulation adjacent to the end of said wire is gathered towards said clamping means and bunched thereby to expose the end portion of the conducting core of said wire.

3. Apparatus as set forth in claim 2 wherein said insulation pushing means comprises a pair of fingers, one of said fingers being in each of said jaw members.

4. Apparatus as set forth in claim 2 wherein said clamping means comprises a pair of clamping plates, one of said plates being mounted on each of said jaw members.

5. Apparatus as set forth in claim 2 wherein said jaw members have spaced-apart projections on said opposed surfaces, the said projections of one of said jaw members being offset with respect to the projections of the other jaw member whereby said projections interdigitate during movement of said jaw members towards each other to define said confined passageway.

6. Apparatus as set forth in claim 2 wherein said insulation pushing means comprises a pair of fingers, one of said fingers being in each of said jaw members, each finger being movably mounted in its respective jaw member for movement towards said clamping means.

7. Apparatus for exposing the conducting core of an insulated wire comprising:
   a pair of jaw members movable relatively towards and away from each other between open and closed positions,
   said jaw members having clamping means at corresponding ends thereof for clamping a conductor extending between said jaws when said jaws are in said closed position,
   conductor supporting and confining means on said jaw members in alignment with said clamping means, said conductor supporting means comprising supporting surfaces for supporting said conductor against substantial lateral flexure, and
   insulation pushing means in said jaw members, said insulation pushing means being movable relatively through said supporting and confining means and towards said clamping means whereby upon clamping of an insulated wire in said clamping means with its end portion extending into said supporting and confining means and upon movement of said insulation pushing means towards said clamping means, the end portion of the insulation of said wire is gathered towards said clamping means and the conducting core of said wire is exposed.